(12) United States Patent
Hatano et al.

(10) Patent No.: US 8,333,442 B2
(45) Date of Patent: Dec. 18, 2012

(54) BRAKE SYSTEM

(75) Inventors: Kunimichi Hatano, Saitama (JP);
Takaaki Ohnishi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/440,524

(22) Filed: Apr. 5, 2012

(65) Prior Publication Data

US 2012/0228924 A1     Sep. 13, 2012

Related U.S. Application Data (62) Division of application No. 11/900,406, filed on Sep. 11, 2007, now abandoned.

(30) Foreign Application Priority Data

Oct. 2, 2006 (JP) ................................. 2006-270556

(51) Int. Cl.
*B60T 8/42* (2006.01)
(52) U.S. Cl. ..................... 303/115.1; 303/113.4; 303/11; 303/114.1
(58) Field of Classification Search .......................... None
See application file for complete search history.

(56) References Cited

U.S. PATENT DOCUMENTS

| | | | |
|---|---|---|---|
| 2,174,615 A | 10/1939 | Bowen et al. | |
| 4,725,103 A * | 2/1988 | Watanabe | ................ 303/122.09 |
| 4,728,155 A | 3/1988 | Resch | |
| 5,029,951 A | 7/1991 | Nishii | |
| 5,217,281 A * | 6/1993 | Fujimoto | ..................... 303/9.63 |
| 5,779,327 A | 7/1998 | Nakashima et al. | |
| 6,033,036 A | 3/2000 | Ruffer et al. | |
| 6,183,049 B1 | 2/2001 | Oka et al. | |
| 6,412,882 B1 * | 7/2002 | Isono et al. | ................. 303/114.1 |
| 6,604,795 B2 | 8/2003 | Isono et al. | |
| 6,899,403 B2 * | 5/2005 | Isono et al. | ..................... 303/11 |
| 7,032,982 B2 | 4/2006 | Ogiwara et al. | |
| 7,309,112 B2 * | 12/2007 | Isono | ............................... 303/11 |
| 7,651,176 B2 | 1/2010 | Inoue et al. | |
| 2002/0084693 A1 | 7/2002 | Isono et al. | |
| 2003/0038541 A1 * | 2/2003 | Suzuki et al. | ................. 303/155 |
| 2005/0067891 A1 | 3/2005 | Ogiwara et al. | |
| 2005/0104443 A1 | 5/2005 | Kusano | |
| 2007/0278855 A1 | 12/2007 | Hatano | |

FOREIGN PATENT DOCUMENTS

| | | |
|---|---|---|
| JP | 49-100082 U | 8/1974 |
| JP | 2003-137084 A | 5/2003 |

* cited by examiner

*Primary Examiner* — Bradley King
*Assistant Examiner* — Thomas Irvin
(74) *Attorney, Agent, or Firm* — Carrier Blackman & Associates, P.C.; William D. Blackman; Joseph P. Carrier

(57) ABSTRACT

When an electrical fluid pressure generator fails and a wheel cylinder is operated by brake fluid pressure generated by a master cylinder, if a first fluid pressure system leading to a rear fluid chamber of the electrical fluid pressure generator fails and is opened to the atmosphere, braking is performed by brake fluid pressure of a second fluid pressure system transmitted from the master cylinder through a front fluid chamber of the electrical fluid pressure generator to a wheel cylinder. At this time, a front supply port, which communicates through a front second cup seal, does not communicate with the master cylinder but with a reservoir. Such configuration prevents leakage of the brake fluid pressure generated by the master cylinder through the front supply port, the front second cup seal and the rear fluid chamber, thereby ensuring braking by the second fluid pressure system.

8 Claims, 7 Drawing Sheets

BRAKE SYSTEM

CROSS-REFERENCE TO RELATED APPLICATIONS

This application is a divisional of U.S. application Ser. No. 11/900,406, filed 11 Sep. 2007, which claims priority under 35 USC §119 based on Japanese patent application No. 2006-270556, filed on Oct. 2, 2006. The subject matter of this priority document is incorporated by reference herein.

BACKGROUND OF THE INVENTION

1. Field of the Invention

The present invention relates to a brake system having a master cylinder for generating brake fluid pressure based on a brake operation of a driver, and an electrically controlled fluid pressure generator (herein after "electrical fluid pressure generator") for generating brake fluid pressure by an electrically controllable actuator.

2. Description of the Related Art Japanese Patent Application Laid-open No. 2003-137084 discloses a brake system of the type referred to as a brake by wire (BBW) brake system, which converts a brake operation of a driver into an electrical signal used to operate an electrical fluid pressure generator, and operates a wheel cylinder by brake fluid pressure generated by the electrical fluid pressure generator.

In this type of BBW brake system, if/when the electrical fluid pressure generator fails, brake fluid pressure generated by a master cylinder is directly transmitted to a wheel cylinder in order to brake the wheel, thereby exerting a failsafe function. Also, the master cylinder is of a tandem type in which the brake fluid pressure is supplied separately to two fluid pressure systems, so that even if a leakage occurs in one of the fluid pressure systems, the other fluid pressure system can brake any of the wheels controlled by the BBW brake system.

Figure 7:
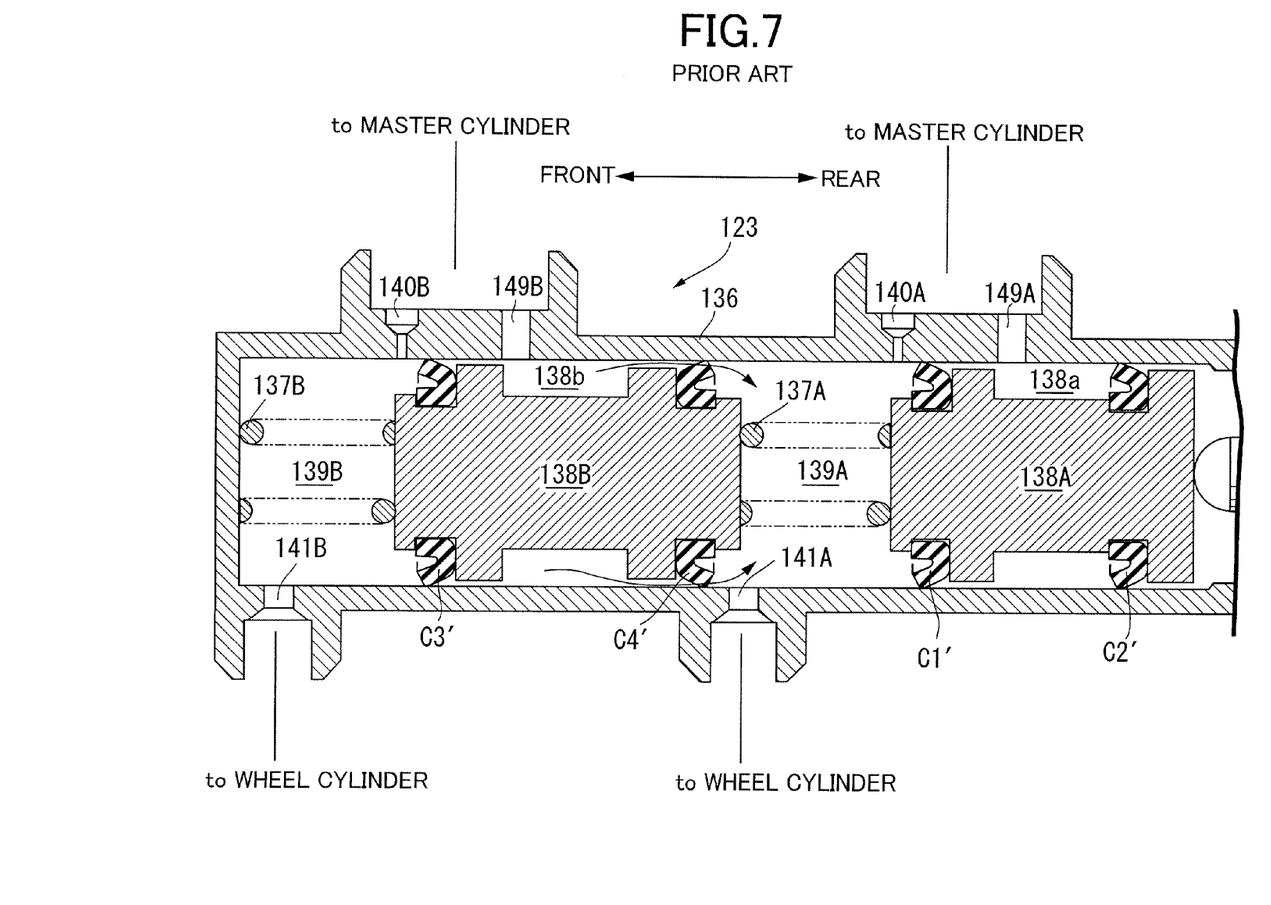
FIG. 7 is a structure of a conventional electrical fluid pressure generator.

FIG. 7 shows a relevant portion of the structure of a conventional electrical fluid pressure generator (motor cylinder 123), excluding the motor and actuator. A rear piston 138A and a front piston 138B are slidably arranged within a cylinder main body 136, and urged by a pair of return springs 137A and 137B in a retreating direction. A rear fluid chamber 139A is defined in front of the rear piston 138A. A front fluid chamber 139B is defined in front of the front piston 138B.

Formed around an outer periphery of the rear piston 138A is a rear reservoir chamber 138a for preventing intrusion of air into the rear fluid chamber 139A. Formed around an outer periphery of the front piston 138B is a front reservoir chamber 138b for preventing intrusion of air into the front fluid chamber 139B. A rear inlet port 140A of the rear fluid chamber 139A and a rear supply port 149A of the rear reservoir chamber 138a communicate with the master cylinder. A rear outlet port 141A of the rear fluid chamber 139A communicates with a wheel cylinder. A front inlet port 140B of the front fluid chamber 139B and a front supply port 149B of the front reservoir chamber 138b communicate with the master cylinder. A front outlet port 141B of the front fluid chamber 139B communicates with the wheel cylinder.

A rear first cup seal C1' is provided at a front end of the rear piston 138A so as to face forward (so that the seal function is exerted in moving forward). A rear second cup seal C2' is provided at a rear end of the rear piston 138A so as to face forward. A front first cup seal C3' is provided at a front end of the front piston 138B so as to face forward. A front second cup seal C4' is provided at a rear end of the front piston 138B so as to face rearward (so that the seal function is exerted in moving rearward).

In the structure of this conventional motor cylinder 123, because the front supply port 149B is connected to the master cylinder, when the motor cylinder 123 fails and the wheel cylinder is operated by brake fluid pressure generated by the master cylinder, if the first fluid pressure system fails and the rear fluid chamber 139A of the motor cylinder 123 is opened to the atmosphere, the brake fluid pressure generated by the master cylinder leaks into a route through the front supply port 149B, the front reservoir chamber 138b, the front second cup seal C4', and the rear fluid chamber 139A. Therefore, there is a possibility that the second fluid pressure system leading to the front fluid chamber 139B might fail at the same time.

SUMMARY OF THE INVENTION

The present invention has been made in view of the above situation, and an object of the present invention is to provide a BBW brake system having two fluid pressure systems in which, when one of the fluid pressure systems fails, function of the other fluid pressure system is secured.

To achieve the above object, according to a first aspect of the present invention, there is provided a brake system comprising: a master cylinder for generating brake fluid pressure based on braking operation of a driver; an electrical fluid pressure generator communicating with the master cylinder which has a rear fluid chamber and a front fluid chamber generating brake fluid pressure by an electrically controllable actuator; and a plurality of wheel cylinders communicating with the rear fluid chamber and the front fluid chamber, respectively, and generating a braking force for braking wheels so that when the electrical fluid pressure generator fails, the wheel cylinders are operated by the brake fluid pressure generated by the master cylinder. The electrical fluid pressure generator includes: a rear piston and a front piston which are advanced by the actuator to generate brake fluid pressure in the rear fluid chamber and the front fluid chamber, respectively; a rear inlet port and a rear outlet port which are formed in the rear fluid chamber and connected to the master cylinder and at least one of the wheel cylinders, respectively; a front inlet port and a front outlet port which are formed in the front fluid chamber and connected to the master cylinder and at least one of the wheel cylinders, respectively; a rear first cup seal arranged at a front end of the rear piston so as to face forward; a rear second cup seal arranged at a rear end of the rear piston so as to face forward; a front first cup seal arranged at a front end of the front piston so as to face forward; a front second cup seal arranged at a rear end of the front piston so as to face rearward; and a rear supply port formed adjacent to and in the rear of the rear inlet port, and a front supply port formed adjacent to and in the rear of the front inlet port, the rear and front supply ports being connected to a reservoir.

According to the first aspect of the invention, when the electrical fluid pressure generator fails and the wheel cylinder is operated by the brake fluid pressure generated by the master cylinder, if a first fluid pressure system leading to the rear fluid chamber of the electrical fluid pressure generator fails and is opened to the atmosphere, braking is performed by brake fluid pressure of the second fluid pressure system transmitted from the master cylinder through the front fluid chamber of the electrical fluid pressure generator to the wheel cylinder. At this time, the front supply port, which communicates through the front second cup seal facing rearward with the rear fluid chamber opened to the atmosphere due to the failure, does not communicate with the master cylinder but with the reservoir. Therefore, it is possible to prevent leakage of the brake fluid pressure generated by the master cylinder through the front supply port, the front second cup seal and the rear fluid chamber, thereby ensuring braking by the second fluid pressure system leading to the front fluid chamber of the electrical fluid pressure generator.

According to a second aspect of the present invention, there is provided a brake system comprising: a master cylinder for generating brake fluid pressure based on braking operation of a driver; an electrical fluid pressure generator communicating with the master cylinder which has a rear fluid chamber and a front fluid chamber generating brake fluid pressure by an electrically controllable actuator; and a plurality of wheel cylinders communicating with the rear fluid chamber and the front fluid chamber, respectively, and generating a braking force for braking wheels so that when the electrical fluid pressure generator fails, the wheel cylinders are operated by the brake fluid pressure generated by the master cylinder. The electrical fluid pressure generator including: a rear piston and a front piston which are advanced by the actuator to generate brake fluid pressure in the rear fluid chamber and the front fluid chamber, respectively; a rear inlet port and a rear outlet port which are formed in the rear fluid chamber and connected to the master cylinder and the wheel cylinder, respectively; a rear supply port formed adjacent to and in the rear of the rear inlet port and connected to the master cylinder; a front inlet port and a front outlet port which are formed in the front fluid chamber and connected to the master cylinder and the wheel cylinder, respectively; a front supply port formed adjacent to and in the rear of the front inlet port and connected to the master cylinder; a rear first cup seal arranged at a front end of the rear piston so as to face forward; a rear second cup seal arranged at a rear end of the rear piston so as to face forward; a front first cup seal arranged at a front end of the front piston so as to face forward; a front second cup seal arranged at a rear end of the front piston so as to face rearward; and a front third cup seal arranged adjacent to and in front of the front second cup seal of the front piston so as to face forward.

According to the second aspect of this invention, when the electrical fluid pressure generator fails and the wheel cylinder is operated by the brake fluid pressure generated by the master cylinder, if the first fluid pressure system leading to the rear fluid chamber of the electrical fluid pressure generator fails and is opened to the atmosphere, braking is performed by the brake fluid pressure of the second fluid pressure system transmitted from the master cylinder through the front fluid chamber of the electrical fluid pressure generator to the wheel cylinder. At this time, the front third cup seal facing forward is arranged between the front supply port communicating with the master cylinder and the rear fluid chamber opened to the atmosphere due to the failure. Therefore, the front third cup seal prevents leakage of the brake fluid pressure generated by the master cylinder from the front supply port through the rear fluid chamber, thereby ensuring braking by the second fluid pressure system leading to the front fluid chamber of the electrical fluid pressure generator.

According to a third aspect of the present invention, in addition to the first or second aspect, the brake system further comprises an anti-lock braking system ("ABS") provided between the electrical fluid pressure generator and the wheel cylinder, the ABS decreasing, maintaining and increasing brake fluid pressure transmitted to the wheel cylinder in order to suppress locking of a wheel upon braking.

According to the third aspect of the present invention, because the ABS for decreasing, maintaining and increasing the brake fluid pressure transmitted to the wheel cylinder is arranged between the electrical fluid pressure generator and the wheel cylinder, locking of a wheel upon braking can be suppressed and a braking distance can be reduced.

According to a fourth aspect of the present invention, in addition to the third aspect, the brake system further comprises a shutoff valve provided between the master cylinder and the electrical fluid pressure generator, the shutoff valve being closed at least during operation of the ABS.

According to the fourth aspect of this invention, because the shutoff valve closing at least during operation of the ABS is arranged between the master cylinder and the electrical fluid pressure generator, it thereby prevents hydraulic pressure change due to the operation of the ABS from being transmitted as a kickback to the master cylinder.

A motor cylinder 23 in non-limiting, exemplary embodiments of the invention discussed below corresponds to the electrical fluid pressure generator in the present invention.

The above-mentioned object, other objects, characteristics, and advantages of the present invention will become apparent from preferred embodiments, which will be described in detail below by reference to the attached drawings.

DESCRIPTION OF THE PREFERRED EMBODIMENTS

Selected illustrative embodiments of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art.

A first embodiment of the present invention will be described with reference to FIGS. 1 to 3.

Figure 1:
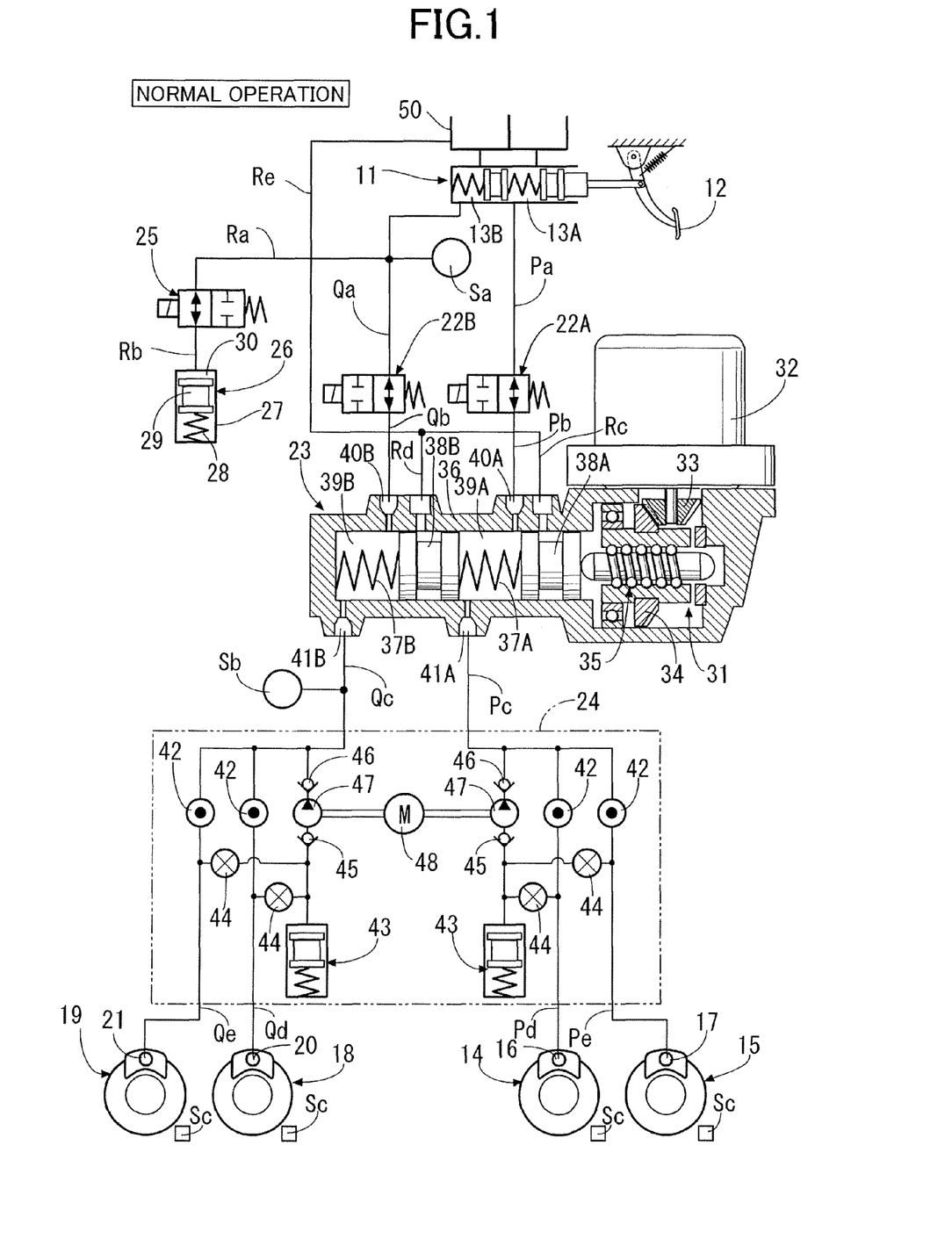
FIG. 1 is a fluid pressure circuit diagram of a vehicle brake system according to a first embodiment of the present invention, showing a configuration for normal operating conditions.

As shown in FIG. 1, a tandem master cylinder 11 has two first fluid pressure chambers 13A and 13B which output brake fluid pressure according to a force applied to a brake pedal 12 by a driver treading on the brake pedal 12. One of the first fluid pressure chambers 13A is connected to wheel cylinders 16 and 17 of disc brake devices 14 and 15 for braking, for example, a left front wheel and a right rear wheel through fluid passages Pa, Pb, Pc, Pd, and Pe. The other first fluid pressure chamber 13B is connected to wheel cylinders 20 and 21 of disc brake devices 18 and 19 for braking, for example, a right front wheel and a left rear wheel through fluid passages Qa, Qb, Qc, Qd, and Qe.

A shutoff valve 22A, which is a normally open solenoid valve, is provided between the fluid passages Pa and Pb. A shutoff valve 22B, which is a normally open solenoid valve, is provided between the fluid passages Qa and Qb. A motor cylinder 23 is provided between the fluid passages Pb, Qb and the fluid passages Pc, Qc. An ABS 24 is provided between the fluid passages Pc, Qc and the fluid passages Pd, Pe; Qd, Qe.

A reaction force permission valve 25, which is a normally closed solenoid valve, is connected between a fluid passage Ra branching from the fluid passage Qa and a fluid passage Rb. A stroke simulator 26 is connected to the fluid passage Rb. The stroke simulator 26 has a cylinder 27 and a piston 29 slidably fitted in the cylinder 27 while being urged by a spring 28. A fluid chamber 30, formed on the side of the piston 29 opposite from the spring 28, communicates with the fluid passage Rb.

An actuator 31 of the motor cylinder 23 has a drive bevel gear 33 provided on the output shaft of an electric motor 32, a follower bevel gear 34 meshing with the drive bevel gear 33, and a ball screw mechanism 35 operated by the follower bevel gear 34. A pair of pistons 38A and 38B urged in a retreat direction by a pair of return springs 37A and 37B are slidably disposed in a cylinder body 36 of the motor cylinder 23. A rear fluid chamber 39A is defined on a front face of the rear piston 38A. A front fluid chamber 39B is defined on a front face of the front piston 38B.

Figure 3:
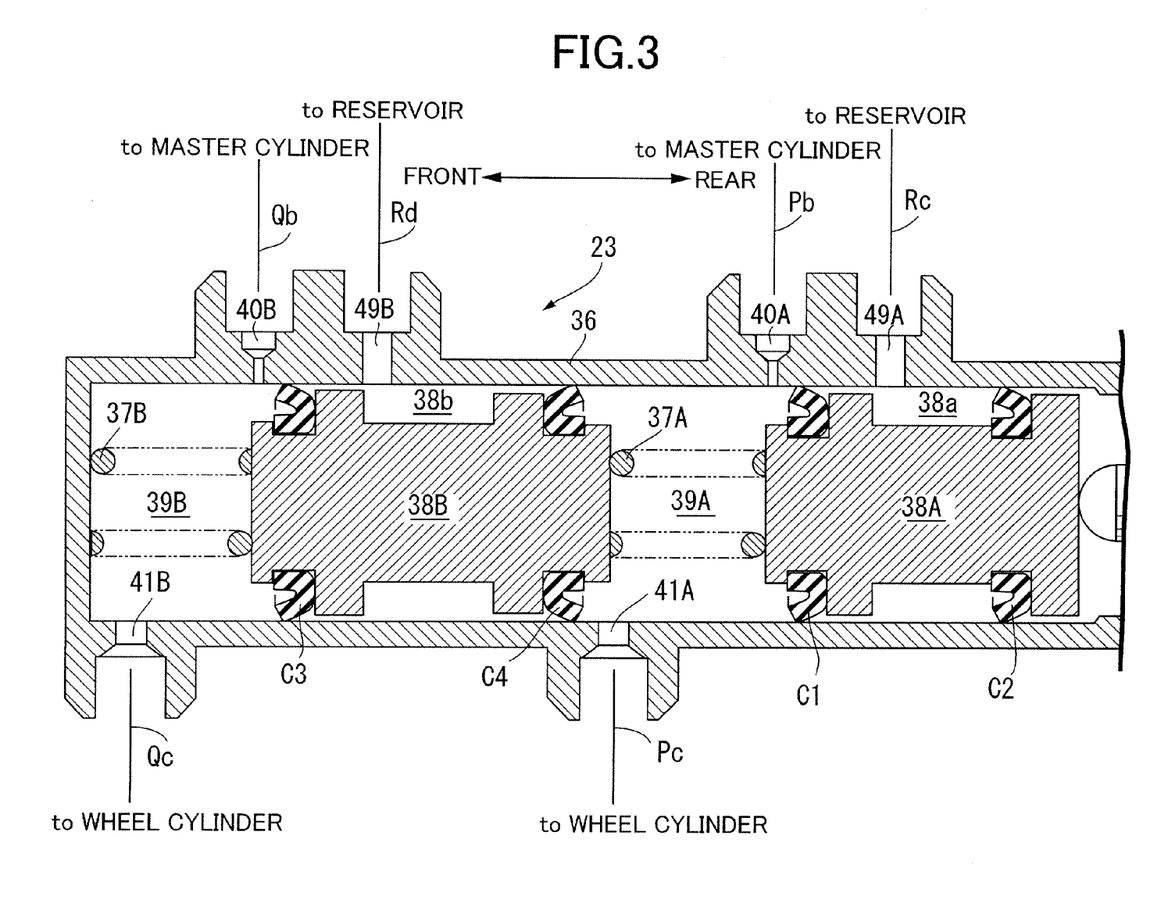
FIG. 3 is an enlarged view of an essential part of the electrical fluid pressure generator of FIG. 1.

As obvious from FIGS. 1 and 3, the rear fluid chamber 39A communicates with the fluid passages Pb and Pc, respectively, through the rear inlet port 40A and the rear outlet port 41A, and with the reservoir 50 through the rear supply port 49A and the fluid passages Rc, Re. The front fluid chamber 39B communicates with the fluid passages Qb and, Qc through the front inlet port 40B and the front outlet port 41B, and with the reservoir 50 through the front supply port 49B and the fluid passages Rd, Re.

A rear first cup seal C1 is provided at a front end of the rear piston 38A so as to face forward (so that the seal function is exerted in moving forward). A rear second cup seal C2 is provided at a rear end of the rear piston 38A so as to face forward. A front first cup seal C3 is provided at a front end of the front piston 38B so as to face forward. A front second cup seal C4 is provided at a rear end of the front piston 38B so as to face rearward (so that the seal function is exerted in rearward moving).

A rear reservoir chamber 38a is formed at an intermediate portion of the rear piston 38A so as to be held between the rear first and second cup seals C1 and C2. A rear supply port 49A communicates with the rear reservoir chamber 38a. A front reservoir chamber 38b is formed at an intermediate portion of the front piston 38B so as to be held between the front first and second cup seals C3 and C4. A front supply port 49B communicates with the front reservoir chamber 38b.

The rear fluid chamber 39A is held between the forward-facing rear first cup seal C1 and the rearward-facing front second cup seal C4 so as to ensure fluid tightness. The forward-facing rear second cup seal C2 prevents rearward leakage from the rear reservoir chamber 38a of the rear piston 38A.

When the motor cylinder 23 is not in operation, the rear first cup seal C1 of the rear piston 38A is located immediately in the rear of the rear inlet port 40A. When the rear piston 38A slightly advances, the rear first cup seal C1 passes over the rear inlet port 40A, and brake fluid pressure is generated in the rear fluid chamber 39A. When the motor cylinder 23 is not in operation, the front first cup seal C3 of the front piston 38B is located immediately in the rear of the front inlet port 40B. When the front piston 38B slightly advances, the front first cup seal C3 passes over the front inlet port 40B, and the brake fluid pressure is generated at the front fluid chamber 39B.

When the electric motor 32 is driven in one direction, the rear and the front pistons 38A and 38B are advanced by the drive bevel gear 33, the follower bevel gear 34, and the ball screw mechanism 35. At a moment when the rear and the front inlet ports 40A and 40B communicating with the fluid passages Pb and Qb are closed, the brake fluid pressure is generated in the rear and the front fluid chambers 39A and 39B, so that the brake fluid pressure can be outputted to the fluid passages Pc and Qc through the rear and the front output ports 41A and 41B.

As shown in FIG. 1, the structure of the ABS 24 is of a well-known type. The ABS 24 has two streams structurally identical to each other: one stream including the disc brake devices 14 and 15 for braking the left front wheel and the right rear wheel; and the other stream for the disc brake devices 18 and 19 for braking the right front wheel and the left rear wheel. Of these streams, the stream for the disc brake devices 14 and 15 will be described as a representative. A pair of in-valves 42 comprising normally open solenoid valves are provided between the fluid passage Pc and the fluid passages Pd, Pe. A pair of out-valves 44 comprising normally closed solenoid valves are provided between the fluid passages Pd, Pe on the downstream side of the in-valves 42 and a reservoir 43. A fluid pressure pump 47 interposed between a pair of check valves 45 and 46 is provided between the reservoir 43 and the fluid passage Pc. The fluid pressure pump 47 is driven by an electric motor 48.

Connected to an electronic control unit (not shown) for controlling the operation of the shutoff valves 22A and 22B, the reaction force permission valve 25, the motor cylinder 23 and the ABS 24, are a fluid pressure sensor Sa for detecting the brake fluid pressure generated by the master cylinder 11, a fluid pressure sensor Sb for detecting the brake fluid pressure transmitted to the disc brake devices 18 and 19, and a vehicle wheel speed sensors Sc for detecting the vehicle wheel speeds of the vehicle wheels.

The operation of the embodiments of the present invention having the above-described arrangement will now be described.

In a normal situation where the system operates normally, the shutoff valves 22A and 22B, comprising normally open solenoid valves, are demagnetized so as to be in an open state, and the reaction force permission valve 25, comprising a normally closed solenoid valve, is magnetized so as to be in an open state. In this state, when the fluid pressure sensor Sa provided in the fluid passage Qa detects a depression on the brake pedal 12 by the driver, the actuator 31 of the motor cylinder 23 operates to advance the rear and front pistons 38A and 38B, thereby generating brake fluid pressure in the rear and front fluid chambers 39A and 39B. This brake fluid pressure is transmitted to the wheel cylinders 16, 17, 20, and 21 of the disc brake devices 14, 15, 18, and 19 through the opened in-valves 42 of the ABS 24, thereby braking the vehicle wheels.

When the rear and front pistons 38A and 38B of the motor cylinder 23 slightly advance, the rear and front inlet ports 40A and 40B are closed to shut off the communication between the fluid passages Pb, Qb and the rear and front fluid chambers 39A and 39B. Therefore, the brake fluid pressure generated by the master cylinder 11 is not transmitted to the disc brake devices 14, 15, 18, and 19. At this time, the brake fluid pressure generated in the other first fluid pressure chamber 13B of the master cylinder 11 is transmitted to the fluid chamber 30 of the stroke simulator 26 through the opened reaction force permission valve 25 to move the piston 29 against the spring 28, thereby generating a pseudo pedal reaction force while permitting the stroke of the brake pedal 12 to eliminate an uncomfortable feeling to the driver.

The operation of the actuator 31 for the motor cylinder 23 is controlled so that the brake fluid pressure generated by the motor cylinder 23 and detected by the fluid pressure sensor Sb provided in the fluid passage Qc has a value corresponding to the brake fluid pressure generated by the master cylinder 11 and detected by the fluid pressure sensor Sa provided in the fluid passage Qa, thereby generating the braking force in the disc brake devices 14, 15, 18, and 19 according to the depressing force input to the brake pedal 12 by the driver.

If slip ratio of any vehicle wheel is increased and a tendency of locking is detected based on the output from the wheel speed sensor Sc corresponding to the vehicle wheel during the above-described braking, the shutoff valves 22A and 22B, comprising normally open solenoid valves, are energized so as to close, the motor cylinder 23 is maintained in the operating state, and in this state the ABS 24 is operated to prevent locking of the vehicle wheel.

That is, when any vehicle wheel has a tendency of locking, a pressure reducing operation is performed to release the brake fluid pressure in the wheel cylinder by opening the out-valve 44 in a state where the transmission of the brake fluid pressure from the motor cylinder 23 is shut off by closing the in-valve 42 communicating with the wheel cylinder; and a pressure maintaining operation is subsequently performed to maintain the brake fluid pressure in the wheel cylinder by closing the out-valve 44, thereby reducing the braking force to avoid locking of the vehicle wheel.

When the vehicle wheel speed is recovered to reduce the slip ratio, a pressure increasing operation is performed to increase the brake fluid pressure in the wheel cylinder by opening the in-valve 42, thereby increasing the braking force for braking the vehicle wheel. When the vehicle wheel again has a tendency of locking due to this pressure increasing operation, the above-described pressure reducing, maintaining and increasing operation is performed again. The operation is repeatedly performed to generate the maximum braking force while preventing locking of the vehicle wheels. The brake fluid flowing into the reservoir 43 during this process is returned by the fluid pressure pump 47 to the fluid passages Pc and Qc on the upstream side.

During the above-described ABS control, the shutoff valves 22A and 22B are maintained in the valve closed state, thereby preventing a fluid pressure fluctuation associated with the operation of the ABS 24 from being transmitted as a kickback from the master cylinder 11 to the brake pedal 12.

When the motor cylinder 23 becomes inoperable, due to power failure for example, braking by the brake fluid pressure generated by the master cylinder 11 is performed in place of the brake fluid pressure generated by the motor cylinder 23.

Figure 2:
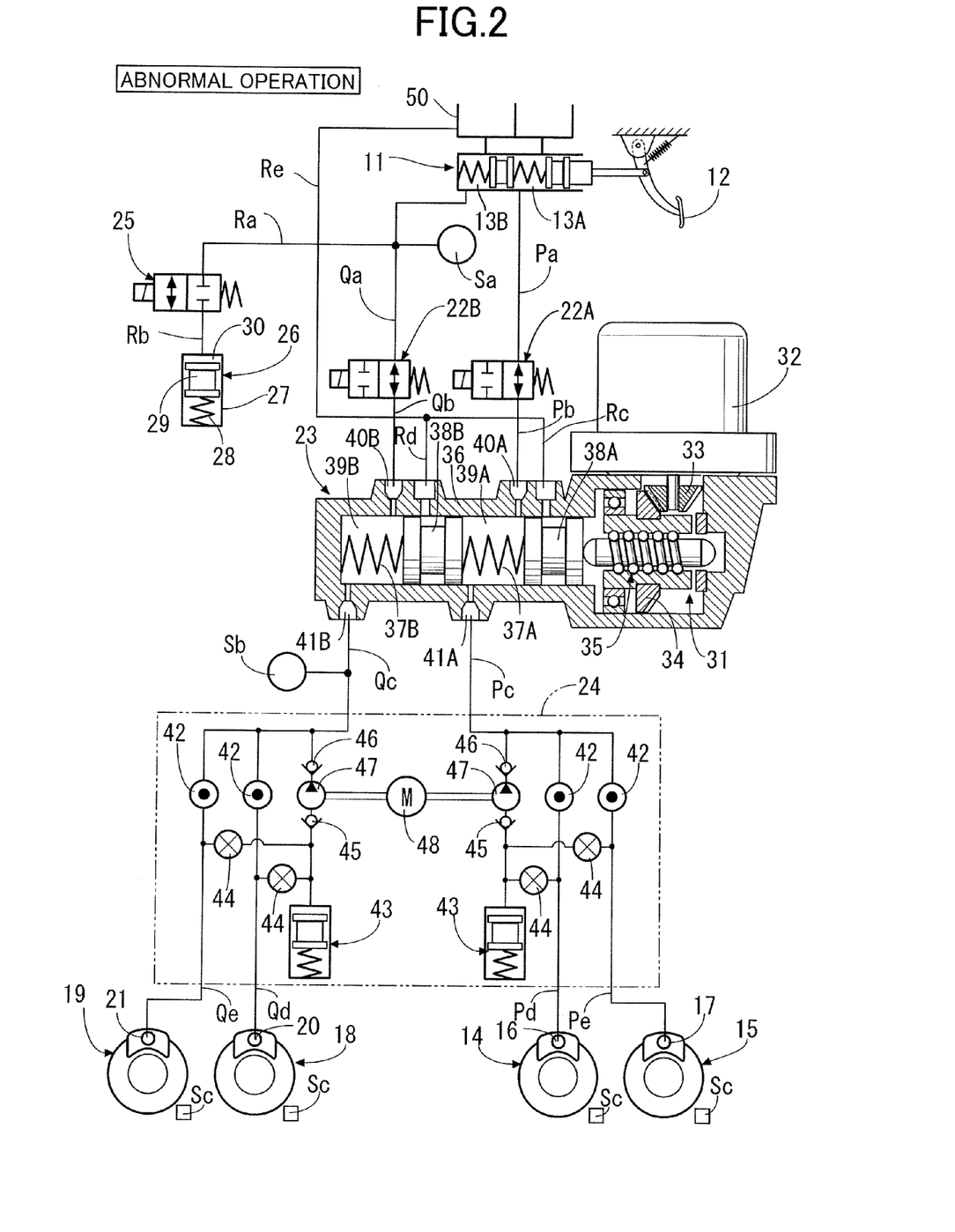
FIG. 2 is the fluid pressure circuit diagram of FIG. 1, showing a configuration for abnormal operating conditions.

In the event of power failure, as shown in FIG. 2, the shutoff valves 22A and 22B, comprising normally open solenoid valves, remain open; the reaction force permission valve 25 comprising a normally closed solenoid valve is automatically closed; the in-valves 42, comprising normally open solenoid valves, are automatically opened; and the out-valves 44, comprising normally closed solenoid valves, are automatically closed. In this state, the brake fluid pressure generated in the fluid chambers 13A and 13B of the master cylinder 11 passes through the shutoff valves 22A and 22B, the fluid chambers 39A and 39B of the motor cylinder 23 and the in-valves 42, without being absorbed by the stroke simulator 26; and operates the wheel cylinders 16, 17, 20, and 21 of the disc brake devices 14, 15, 18, and 19 for respectively braking the vehicle wheels, thus generating the braking force without any problem.

The first and second fluid pressure lines are completely separate and independent from each other. That is, the first fluid pressure line extends from one first fluid pressure chamber 13A in the master cylinder 11 to the wheel cylinders 16 and 17 of the disc brake devices 14 and 15 for the left front wheel and the right rear wheel, through the fluid passage Pa, the shutoff valve 22A, the fluid passage Pb, one fluid chamber 39A of the motor cylinder 23 and the fluid passages Pc, Pd, and Pe; and the second fluid pressure line extends from the other first fluid pressure chamber 13B in the master cylinder 11 to the wheel cylinders 20 and 21 of the disc brake devices 18 and 19 for the right front wheel and the left rear wheel, through the fluid passage Qa, the shutoff valve 22B, the fluid passage Qb, the other fluid chamber 39B of the motor cylinder 23 and the fluid passages Qc, Qd, and Qe. Therefore, even when trouble such as leakage or clogging of the brake fluid pressure occurs in one of the first and second fluid pressure lines, braking force can be generated in at least two of the four wheels to achieve fail-safe operation of the system.

In conventional system, as shown by way of example in FIG. 7, because the front supply port 49B is connected not to the reservoir 50 but to the master cylinder 11, when the first fluid pressure system fails and the rear fluid chamber 39A of the motor cylinder 23 is opened to the atmosphere, the brake fluid pressure generated in the fluid chamber 13B of the master cylinder 11 leaks via the route through the front supply port 49B, the front reservoir chamber 38b, the front second cup seal C4, and the rear fluid chamber 39A. Therefore, there is a possibility that the second fluid chamber system leading to the front fluid chamber 39B might fail at the same time.

However, according to the first embodiment shown in FIG. 3, because the front supply port 49B is connected to the reservoir 50, even if the first fluid chamber system fails and the rear fluid chamber 39A of the motor cylinder 23 is opened to the atmosphere, the brake fluid pressure generated in the fluid chamber 13B of the master cylinder 11 is not transmitted to the front supply port 49B, and thus, the brake fluid pressure does not leak to the route through the front reservoir chamber 38b, the front second cup seal C4, and the rear fluid chamber 39A. Therefore, it is possible to prevent the second fluid pressure system leading to the front fluid chamber 39B from failing at the same time.

Figure 4:
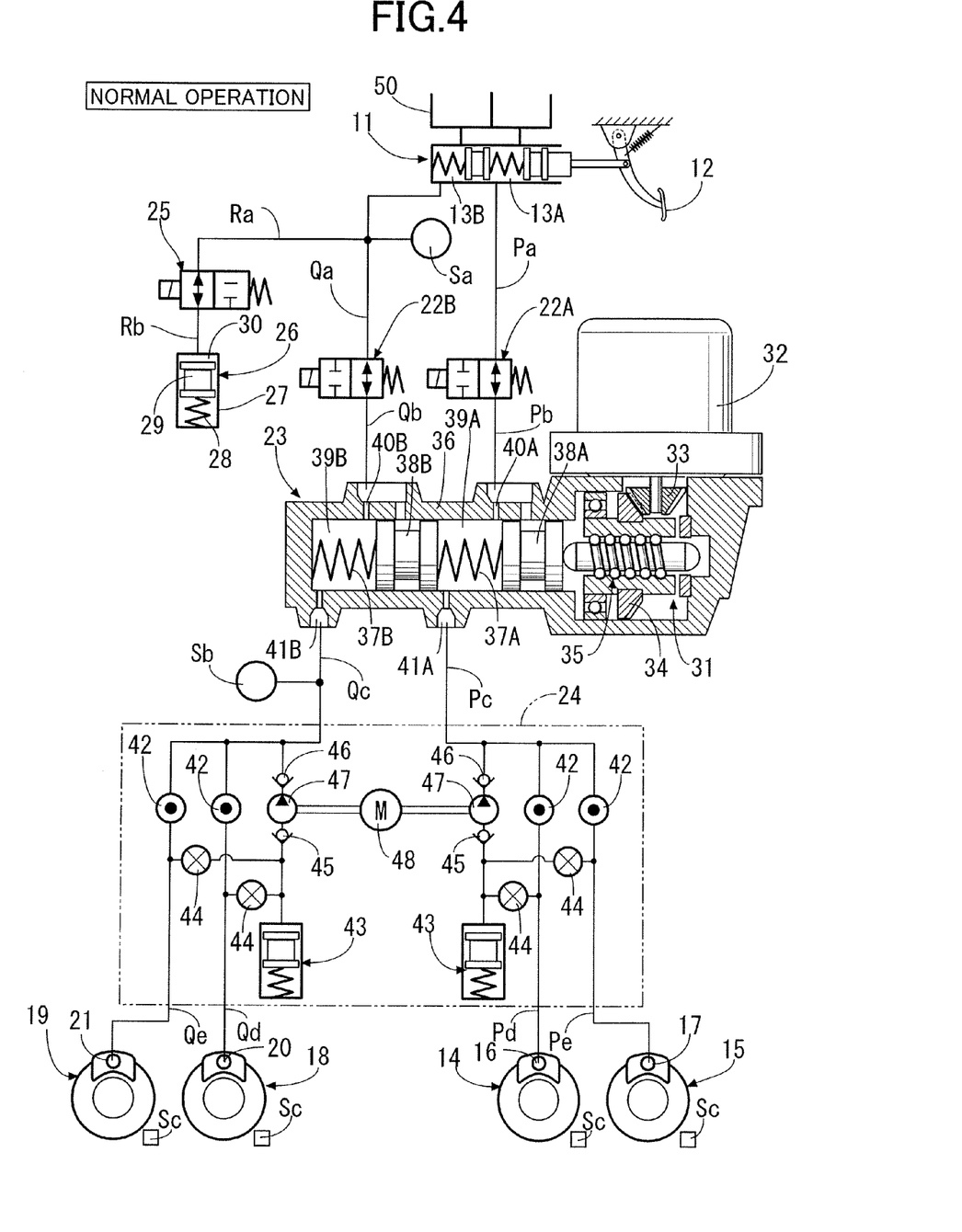
FIG. 4 is a fluid pressure circuit diagram of a vehicle brake system according to a second embodiment of the present invention, showing a configuration for normal operating conditions.
Figure 5:
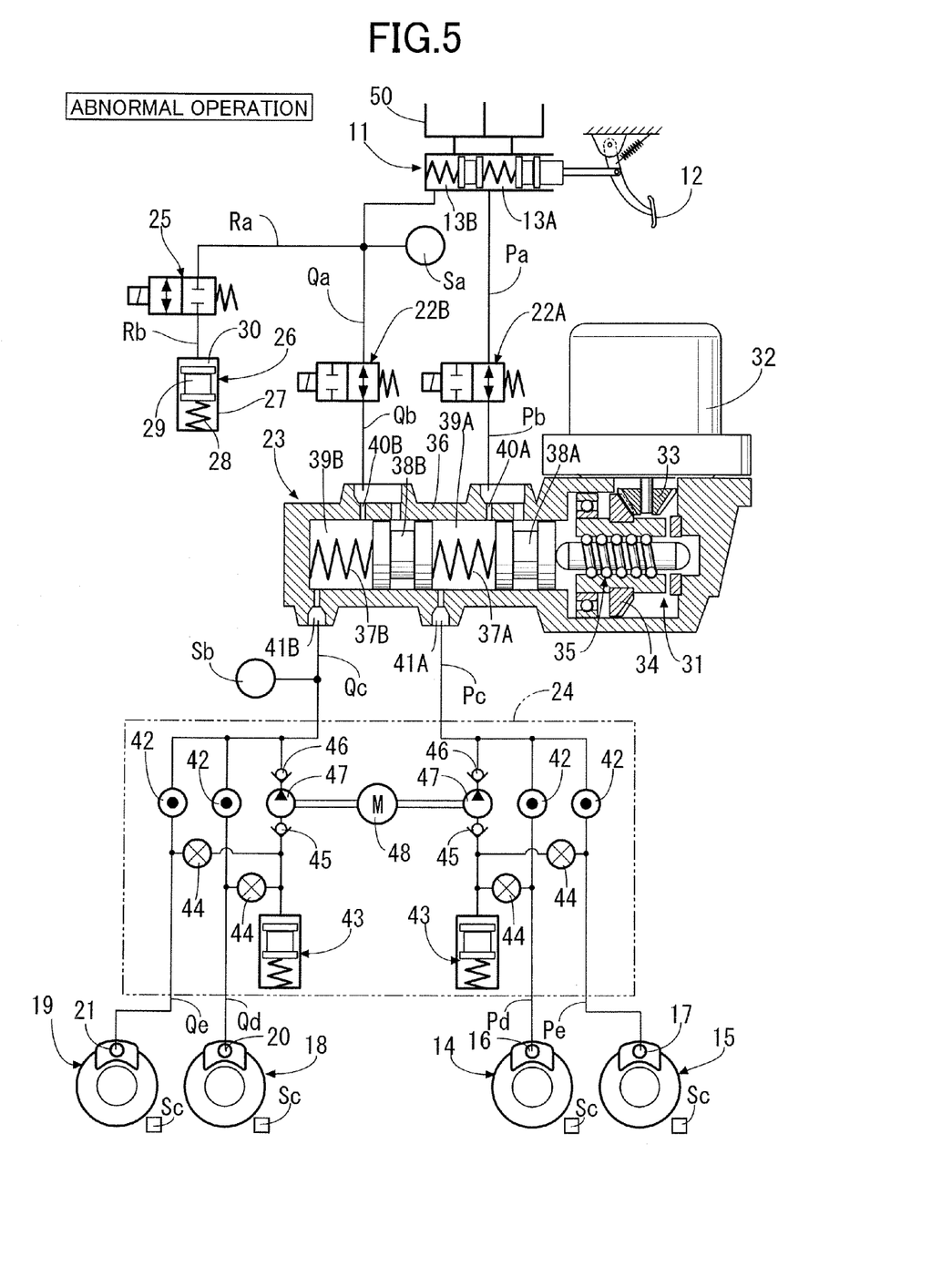
FIG. 5 is the fluid pressure circuit diagram of FIG. 4, showing a configuration for abnormal operating conditions.
Figure 6:
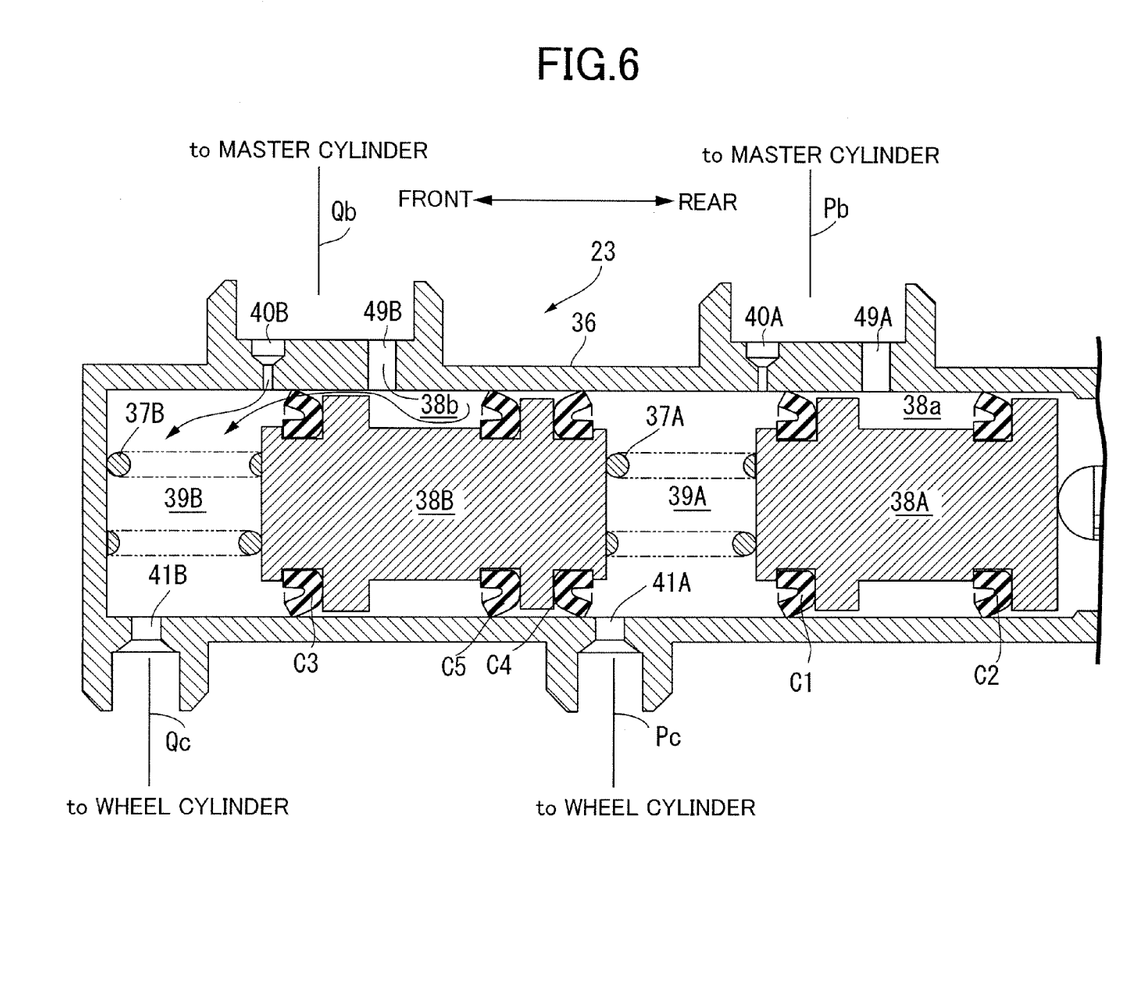
FIG. 6 is an enlarged view of an essential part of the electrical fluid pressure generator of FIG. 4.

Next, a second embodiment of the present invention will be described based on FIGS. 4 to 6.

In the first embodiment as described above, the rear and front supply ports 49A and 49B of the motor cylinder 23 are connected to the reservoir 50, but in the second embodiment, the rear and front supply ports 49A and 49B are connected to the pair of fluid chambers 13A and 13B of the master cylinder 11 as in the case of the conventional example shown in FIG. 7. Additionally, however, according to the second embodiment, a forward-facing front third cup seal C5 is arranged immediately in front of the front second cup seal C4 of the front piston 38B, so as to be opposed to the rear end of the front reservoir chamber 38b.

Therefore, when an abnormality occurs, the first fluid pressure system, which extends from the fluid chamber 13A of the master cylinder 11 through the fluid passage Pa, the shutoff valve 22A, the fluid passage Pb, the rear fluid chamber 39A of the motor cylinder 23, the fluid passage Pc and the fluid passages Pd, Pe to the wheel cylinders 16 and 17 of the disc brake devices 14 and 15 of the left front wheel and the right rear wheel, does not leak brake fluid. Even if the brake fluid pressure is transmitted from the other fluid chamber 13B of the master cylinder through the fluid passage Qa, the shutoff valve 22B and the fluid passage Qb to the front fluid chamber 39B of the motor cylinder 23 and a front reservoir chamber 38b, because the front reservoir chamber 38b is no longer in communication with the rear fluid chamber 39A, which is opened to the atmosphere, due to the front third cup seal C5, leakage of the brake fluid pressure of the front fluid chamber 39B through the rear fluid chamber 39A is prevented. Thus, the first and second fluid pressure systems do not fail at the same time.

As will be understood, each of the above two embodiments includes a means for preventing leakage of the brake fluid pressure of the front fluid chamber 39B through the rear fluid chamber 39A. In the first embodiment, the means for preventing leakage of the brake fluid pressure of the front fluid chamber 39B through the rear fluid chamber 39A comprises a rear supply port formed adjacent to and in the rear of the rear inlet port, and a front supply port formed adjacent to and in the rear of the front inlet port, the rear and front supply ports being connected to a reservoir. In the second embodiment, the means for preventing leakage of the brake fluid pressure of the front fluid chamber 39B through the rear fluid chamber 39A comprises a front third cup seal arranged adjacent to and in front of the front second cup seal of the front piston so as to face forward.

The embodiments of the present invention have been described above, but various changes in design may be made without departing from the subject matter of the present invention as indicated by the appended claims.

For example, the brake systems of the embodiments comprise the ABS 24, but the present invention is also applicable to a brake system not having the ABS 24.

What is claimed is:

1. A brake system comprising:
a master cylinder for generating brake fluid pressure based on braking operation of a driver;
an electrical fluid pressure generator communicating with the master cylinder, and having a rear fluid chamber and a front fluid chamber generating brake fluid pressure by an electrically controllable actuator; and
a plurality of wheel cylinders communicating with the rear fluid chamber and the front fluid chamber, respectively, and generating a braking force for braking wheels so that when the electrical fluid pressure generator fails, the wheel cylinders are operated by the brake fluid pressure generated by the master cylinder;
the electrical fluid pressure generator including:
a rear piston and a front piston which are advanced by the actuator to generate brake fluid pressure in the rear fluid chamber and the front fluid chamber, respectively;
a rear inlet port and a rear outlet port which are formed in the rear fluid chamber and connected to the master cylinder and the wheel cylinder, respectively;
a front inlet port and a front outlet port which are formed in the front fluid chamber and connected to the master cylinder and the wheel cylinder, respectively;
a rear first cup seal arranged at a front end of the rear piston so as to face forward;
a rear second cup seal arranged at a rear end of the rear piston so as to face forward;
a front first cup seal arranged at a front end of the front piston so as to face forward;
a front second cup seal arranged at a rear end of the front piston so as to face rearward; and
a rear supply port formed adjacent to and in the rear of the rear inlet port, and a front supply port formed adjacent to and in the rear of the front inlet port, the rear and front supply ports being connected to a reservoir.

2. The brake system according to claim 1, further comprising an anti-lock braking system ("ABS") provided between the electrical fluid pressure generator and the wheel cylinder, the ABS decreasing, maintaining and increasing brake fluid pressure transmitted to the wheel cylinder in order to suppress locking of a wheel upon braking.

3. The brake system according to claim 2, further comprising a shutoff valve provided between the master cylinder and the electrical fluid pressure generator, the shutoff valve being closed at least during operation of the ABS.

4. The brake system according to claim 1, wherein a fluid passage extended from the rear supply port and another fluid passage extended from the front supply port are connected together into a single fluid passage which is connected to the reservoir of the master cylinder.

5. The brake system according to claim 1, further comprising a fluid pressure sensor for detecting brake fluid pressure generated by the master cylinder, and which is provided in a fluid pressure system in which a stroke simulator is arranged.

6. A brake system comprising:
a master cylinder for generating brake fluid pressure based on braking operation of a driver;
an electrical fluid pressure generator communicating with the master cylinder, and having a rear fluid chamber and a front fluid chamber generating brake fluid pressure by an electrically controllable actuator; and
a plurality of wheel cylinders communicating with the rear fluid chamber and the front fluid chamber, respectively, and generating a braking force for braking wheels so that when the electrical fluid pressure generator fails, the wheel cylinders are operated by the brake fluid pressure generated by the master cylinder;
the electrical fluid pressure generator including:
a rear piston and a front piston which are advanced by the actuator to generate brake fluid pressure in the rear fluid chamber and the front fluid chamber, respectively;
a rear inlet port and a rear outlet port which are formed in the rear fluid chamber and connected to the master cylinder and the wheel cylinder, respectively;
a front inlet port and a front outlet port which are formed in the front fluid chamber and connected to the master cylinder and the wheel cylinder, respectively;
a rear first cup seal arranged at a front end of the rear piston so as to face forward;
a rear second cup seal arranged at a rear end of the rear piston so as to face forward;
a front first cup seal arranged at a front end of the front piston so as to face forward;
a front second cup seal arranged at a rear end of the front piston so as to face rearward; and
a means for preventing leakage of the brake fluid of the front fluid chamber through the rear fluid chamber;
wherein the means for preventing leakage of the brake fluid of the front fluid chamber through the rear fluid chamber comprises a rear supply port formed adjacent to and in the rear of the rear inlet port, and a front supply port formed adjacent to and in the rear of the front inlet port, the rear and front supply ports being connected to a reservoir.

7. The brake system according to claim 6, wherein the reservoir is connected to the master cylinder, and a fluid passage extended from the rear supply port and another fluid passage extended from the front supply port are connected together into a single fluid passage which is connected to the reservoir.

8. The brake system according to claim 6, further comprising a fluid pressure sensor for detecting brake fluid pressure generated by the master cylinder, and which is provided in a fluid pressure system in which a stroke simulator is arranged.

* * * * *